Nov. 17, 1942.   H. C. CAMPBELL   2,302,525
CHICKEN PICKER AND CLEANER
Filed June 27, 1940   2 Sheets-Sheet 1
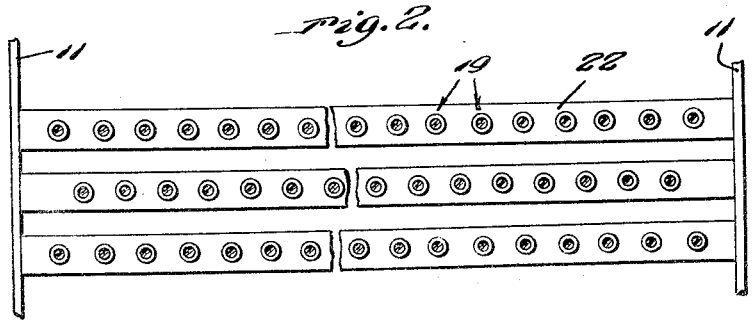
Inventor
Harold C. Campbell
By Clarence A. O'Brien Nov. 17, 1942.  H. C. CAMPBELL  2,302,525
CHICKEN PICKER AND CLEANER
Filed June 27, 1940   2 Sheets-Sheet 2
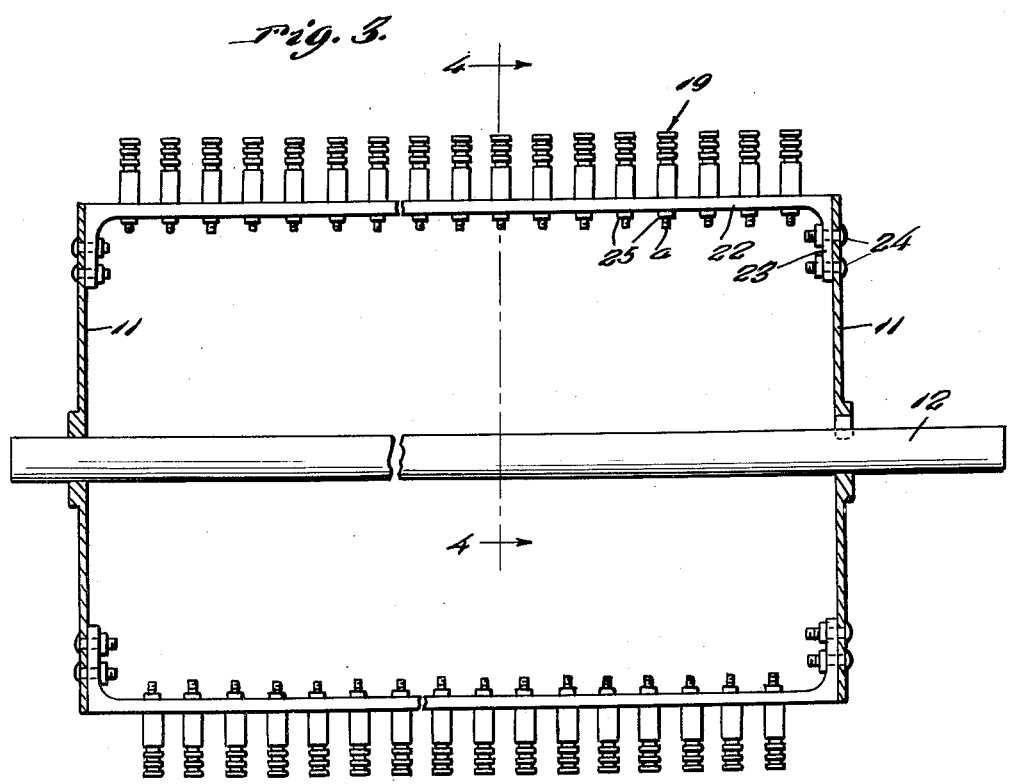
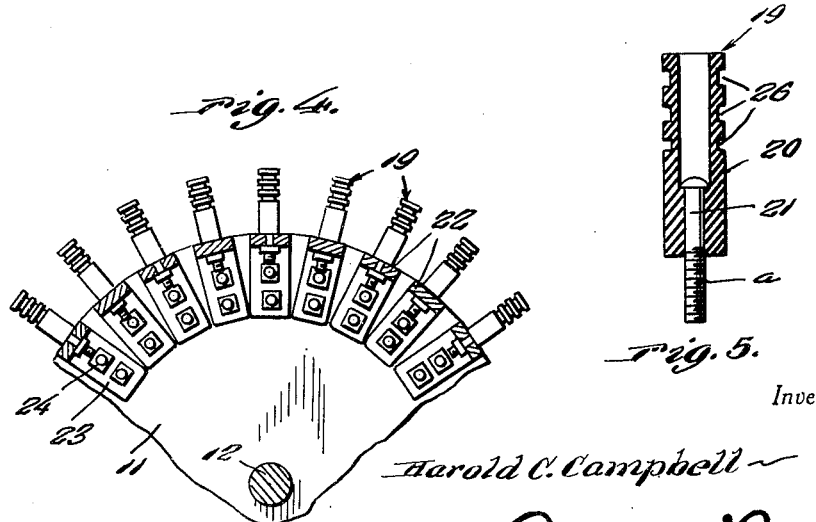
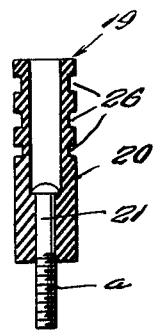
Inventor
Harold C. Campbell
By Clarence A. O'Brien
Attorney Patented Nov. 17, 1942

2,302,525

UNITED STATES PATENT OFFICE 2,302,525

CHICKEN PICKER AND CLEANER

Harold C. Campbell, Ashley, Ohio, assignor to The Ashley Machine Company, Piqua, Ohio, a corporation of Ohio Application June 27, 1940, Serial No. 342,822

3 Claims. (Cl. 17—11.1)

This invention appertains to new and useful improvements in apparatus for conveniently picking and cleaning poultry.

The principal object of the present invention is to provide a picking and cleaning machine which is of simplified construction and not susceptible to the ready development of defects.

Another important object of the invention is to provide a machine for picking and cleaning poultry which is not hazardous to the worker operating the same.

Other objects and advantages of the invention will become apparent to the reader of the following specification.

In the drawings—

Figure 1 represents a side elevational view of a chicken picker and cleaner embodying the preferred form of the invention.

Figure 2 represents a top plan development of a fragment of the rotor of the improved picker and cleaner shown in Fig. 1.

Figure 3 is a longitudinal sectional view through the rotor, on a scale enlarged over that of Fig. 1.

Figure 4 is a section on the line 4—4 of Figure 3, with the picker fingers shown in side elevation.

Figure 5 is a longitudinal sectional view through one of the fingers, on a scale enlarged over that of Figs. 3 and 4.

Referring to the drawings, wherein like numerals designate like parts, it can be seen that the machine preferably consists of a base 5 having upstanding corner posts 6 and upper and lower super-frame members 7 and 8 at the sides and ends of the machine. Upon the rear end portions of the super-frame members 7 is mounted a hood 9 for directing feathers and other matter relieved from the poultry by the rotor assembly generally referred to by numeral 10, onto the base below the hood for subsequent disposal.

The rotor assembly 10 consists of a pair of disk members 11—11 suitably secured to a shaft 12 which is journaled through bearings on the super-frame members 8 and which shaft has keyed thereon a large pulley 13. A belt 14 is trained over the pulley 13 and over a smaller pulley 15, which is keyed on the armature shaft 16 of an electric motor 17, this motor 17 being suitably secured on the base 5.

A switch 18 is employed for controlling the motor 17 which, of course, drives the shaft 12 and rotor 10 by way of the belt 14. A plurality of fingers 19 on the rotor serve to relieve the fowl of its feathers after the fowl has, of course, been first scalded. As shown in Figure 5, each of these fingers consists of an elongated cylindrical rubber element 20 being hollow for substantially one-half of its length and formed with a bore for the rest of its length to receive a portion of a bolt 21, the threaded portion a of which is disposed through a corresponding opening in one of the numerous connecting bars 22 which bridge the disk-like members 11, each of these cross bars having a foot 23 at each end thereof apertured to receive bolts 24 which extend through the disk-like end walls 11. Each of the bolts 21 is equipped with a nut 25 for definitely securing the finger 19 in outstanding position on the bar 22, and, as can be seen in Figure 5, the outer half portion of the body 20 is provided with a plurality of circumferentially extending grooves 26 which define shoulders capable of gripping the feathers of a fowl and pulling the same loose from the body of the fowl.

In the use of the machine, the fowl is held upon the rotor and turned as it is picked and cleaned.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In a poultry plucking device, including a rotating member and resilient plucking fingers mounted thereon, means for improving the frictional engagement properties of the plucking portion of such fingers comprising a plurality of spaced circumferentially extending ridges, the said ridges being substantially smooth-faced at their outermost portions.

2. A poultry plucking finger member of the character described, comprising a substantially cylindrical body formed of elastic material, said cylindrical body having two or more ribs on the outer surface thereof defining intermediate grooves of lesser diameter, all the ribs on said fingers having smooth faced outer surfaces of substantial width and the grooves being defined at least in part by surfaces joining the adjacent faces of the ribs at such angles as to form relatively sharp edges.

3. A poultry plucking finger member of the character described, having at least two annular ribs having smooth faced outer surfaces defining intermediate grooves, one of said ribs being at the outer end of the finger, said adjacent ribs being spaced apart such a distance that the width of the groove is substantially equal to the width of the face portion of an adjacent rib.

HAROLD C. CAMPBELL.